United States Patent
Kim et al.

(10) Patent No.: US 10,228,598 B2
(45) Date of Patent: Mar. 12, 2019

(54) DISPLAY DEVICE HAVING IMPROVED DISPLAY QUALITY

(71) Applicant: Samsung Display Co. Ltd., Yongin-si, Gyeonggi-do (KR)

(72) Inventors: Hyun Joon Kim, Yongin-si (KR); Kyung Bae Kim, Seongnam-si (KR); Il Gon Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/610,142

(22) Filed: May 31, 2017

(65) Prior Publication Data

US 2018/0081217 A1    Mar. 22, 2018

(30) Foreign Application Priority Data

Sep. 21, 2016 (KR) .......................... 10-2016-0120589

(51) Int. Cl.
| | |
|---|---|
| *G02F 1/1368* | (2006.01) |
| *G02F 1/1334* | (2006.01) |
| *G02F 1/1335* | (2006.01) |
| *G02F 1/1362* | (2006.01) |
| *G02F 7/00* | (2006.01) |
| *G02F 1/1333* | (2006.01) |

(52) U.S. Cl.
CPC .......... *G02F 1/1368* (2013.01); *G02F 1/1362* (2013.01); *G02F 1/133345* (2013.01); *G02F 1/133512* (2013.01); *G02F 1/133536* (2013.01); *G02F 1/136227* (2013.01); *G02F 1/136286* (2013.01); *G02F 2001/133548* (2013.01); *G02F 2001/133565* (2013.01); *G02F 2001/136222* (2013.01); *G02F 2201/123* (2013.01); *G02F 2201/52* (2013.01); *G02F 2203/055* (2013.01)

(58) Field of Classification Search
CPC combination set(s) only.
See application file for complete search history.

(56) References Cited

U.S. PATENT DOCUMENTS

| | | | |
|---|---|---|---|
| 2007/0002199 A1* | 1/2007 | Fujikawa | ........ G02F 1/136209 349/43 |
| 2007/0200492 A1* | 8/2007 | Cok | ............. H01L 27/322 313/506 |
| 2015/0331278 A1* | 11/2015 | Araki | .......... G02F 1/133617 349/61 |

FOREIGN PATENT DOCUMENTS

| | | |
|---|---|---|
| JP | 2015-219272 | 7/2015 |
| JP | 2016-050031 | 11/2016 |
| KR | 10-2012-0001387 A | 1/2012 |
| KR | 10-2015-0021013 A | 2/2015 |
| KR | 10-2016-0028580 A | 3/2016 |

* cited by examiner

*Primary Examiner* — Lauren Nguyen
(74) *Attorney, Agent, or Firm* — Innovation Counsel LLP

(57) ABSTRACT

A provided is a display device. The display device in which a plurality of pixels comprising a first pixel for displaying a first color is defined, the display device comprises: an insulating substrate; and a color adjustment pattern which is disposed in a first pixel on the insulating substrate, emits incident light by adjusting the color of the incident light, and has a first stepped portion formed on at least a part of an edge.

20 Claims, 12 Drawing Sheets

DISPLAY DEVICE HAVING IMPROVED DISPLAY QUALITY

This application claims priority to Korean Patent Application No. 10-2016-0120589, filed on Sep. 21, 2016 in the Korean Intellectual Property Office, and all the benefits accruing therefrom under 35 U.S.C. § 119, the disclosure of which in its entirety is herein incorporated by reference.

BACKGROUND

1. Field

The present inventive concept relates to a display device.

2. Description of the Related Art

The significance of display devices is increasingly enlarged with the development of multimedia. In response thereto, display devices such as a liquid crystal display device and an organic light emitting display are used. In general, the display device displays an image, using light emitted from a light source, for example, a backlight assembly or a light emitting element. The display device may include a plurality of pixels which represents primary colors different from each other to achieve a color display.

As a method of making each pixel represents a single primary color, a method of arranging a color filter for each pixel on an optical path extending from a light source to a viewer may be provided as an example. The color filter may achieve a primary color, by absorbing at least a partial wavelength band of incident light and by selectively transmitting only light of the partial wavelength band. In this case, as the wavelength of the light transmitted through the color filter is closer to the specific wavelength of each primary color, it is possible to accurately achieve the color.

On the other hand, development of a method for further improving the color purity of the display device is required.

SUMMARY

However, because the color purity of the light transmitted through the aforementioned color filter is not sufficiently high, it is not possible to accurately represent the desired image.

An aspect of the present inventive concept provides a display device having improved display quality.

Another aspect of the present inventive concept provides a display device capable of preventing a floating failure of a pixel electrode connected to a switching element via a contact hole, despite the use of a color adjustment pattern having a sufficient maximum thickness.

The aspects of the present inventive concept are not limited to those mentioned above, but other aspects which have not been mentioned will be clearly understood by those skilled in the art from the following description.

According to an exemplary embodiment of the inventive concept, there is provided a display device. The display device in which a plurality of pixels comprising a first pixel for displaying a first primary color is defined, the display device comprises: an insulating substrate; and a color adjustment pattern which is disposed in the first pixel on the insulating substrate, alters the color of the incident light, and has a first stepped portion formed on a sidewall.

In an exemplary embodiment, the color adjustment pattern may comprise: a wavelength absorption pattern which is disposed on the insulating substrate and selectively transmits a predetermined wavelength band of the incident light; and a wavelength conversion pattern which is disposed directly on the wavelength absorption pattern and converts a center wavelength of the incident light from a light source, wherein, in a plan view, an area occupied by the wavelength absorption pattern is larger than an area occupied by the wavelength conversion pattern.

In an exemplary embodiment, in a plan view, the area of a top surface of the wavelength absorption pattern may be greater than that of a bottom surface of the wavelength conversion pattern.

In an exemplary embodiment, the display device may further comprise: a switching element which is disposed between the insulating substrate and the color adjustment pattern; and a pixel electrode which is disposed on the color adjustment pattern and is electrically connected to the switching element.

In an exemplary embodiment, the display device may further comprise: a polarizing element disposed between the color adjustment pattern and the pixel electrode.

In an exemplary embodiment, the display device may further comprise: a liquid crystal layer disposed on the pixel electrode. The light source may emit light having a center wavelength shorter than that of the first primary color.

In an exemplary embodiment, the display device may further comprise: a light shielding member disposed between the insulating substrate and the switching element.

In an exemplary embodiment, the pixel electrode may have a second stepped portion formed by the first stepped portion.

In an exemplary embodiment, at least a part of the wavelength conversion pattern may overlap the switching element.

In an exemplary embodiment, the plurality of pixels may further comprise a second pixel which displays a second primary color having a center wavelength shorter than that of the first primary color, and the display device may further comprise a light transmitting pattern which is disposed in the second pixel on the insulating substrate and includes a light transmitting resin and light scattering particles dispersed in the light transmitting resin.

In an exemplary embodiment, the color adjustment pattern may comprise: a wavelength absorption pattern that transmits a predetermined wavelength band of incident light; and a wavelength conversion pattern which converts a center wavelength of the incident light.

In an exemplary embodiment, a thickness of the light transmitting pattern may be greater than a thickness of the wavelength absorption pattern, and the thickness of the light transmitting pattern is greater than a maximum thickness of the wavelength conversion pattern.

In an exemplary embodiment, the light transmitting pattern may have a third stepped portion formed on a sidewall.

In an exemplary embodiment, the display device may further comprise: a second wavelength absorption pattern which is disposed between the insulating substrate and the light transmitting pattern and is disposed in the second pixel to selectively transmit a predetermined wavelength band of the incident light.

In an exemplary embodiment, the display device may further comprise: a light shielding member which is disposed on the insulating substrate to overlap the wavelength absorption pattern and the light transmitting pattern. The wavelength absorption pattern and the light transmitting pattern may be spaced apart from each other on the light shielding member.

According to another exemplary embodiment of the inventive concept, there is provided a display device. The display device in which a plurality of pixels including a first pixel and a second pixel is defined, the display device comprises: an insulating substrate; a color adjustment pattern which is disposed in the first pixel on the insulating substrate; and a light transmitting pattern which is disposed in the second pixel on the insulating substrate, wherein the first pixel displays a first primary color, the second pixel displays a second color having a center wavelength shorter than the first color, and a thickness of the color adjustment pattern is greater than a thickness of the light transmitting pattern.

In an exemplary embodiment, the display device may further comprise: a protective film which is disposed on the color adjustment pattern and the light transmitting pattern; and a polarizing element which is disposed on the protective film and overlaps the color adjustment pattern and the light transmitting pattern, wherein the polarizing element overlapping the color adjustment pattern and the polarizing element overlapping the light transmitting pattern may be located at different levels.

In an exemplary embodiment, wherein the thickness of the color adjustment pattern may be 7 μm or more and 9 μm or less.

In an exemplary embodiment, the color adjustment pattern may comprise: a wavelength absorption pattern which is disposed on the insulating substrate and transmits a predetermined wavelength band of incident light, and a wavelength conversion pattern which is disposed directly on the wavelength absorption pattern and converts the center wavelength of the incident light, wherein a thickness of the wavelength conversion pattern may be larger than a thickness of the wavelength absorption pattern.

In an exemplary embodiment, an area of a top surface of the wavelength absorption pattern may be greater than an area of a bottom surface of the wavelength conversion pattern.

According to the display device of an aspect of the present inventive concept, by disposing a wavelength conversion pattern for converting the wavelength of the incident light for each pixel, and a wavelength absorption pattern for selectively transmitting predetermined wavelengths of the incident light, improved color purity can be achieved.

Further, a stepped portion may be formed by disposing a sidewall of the wavelength absorption pattern so as to protrude from a sidewall of the wavelength conversion pattern, and by disposing the pixel electrode along the stepped portion, an open circuit failure of the pixel electrode may be prevented.

The effects of the embodiments of the present inventive concept are not limited by the contents mentioned above, and further various effects are included in this specification.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION

Figure 1:
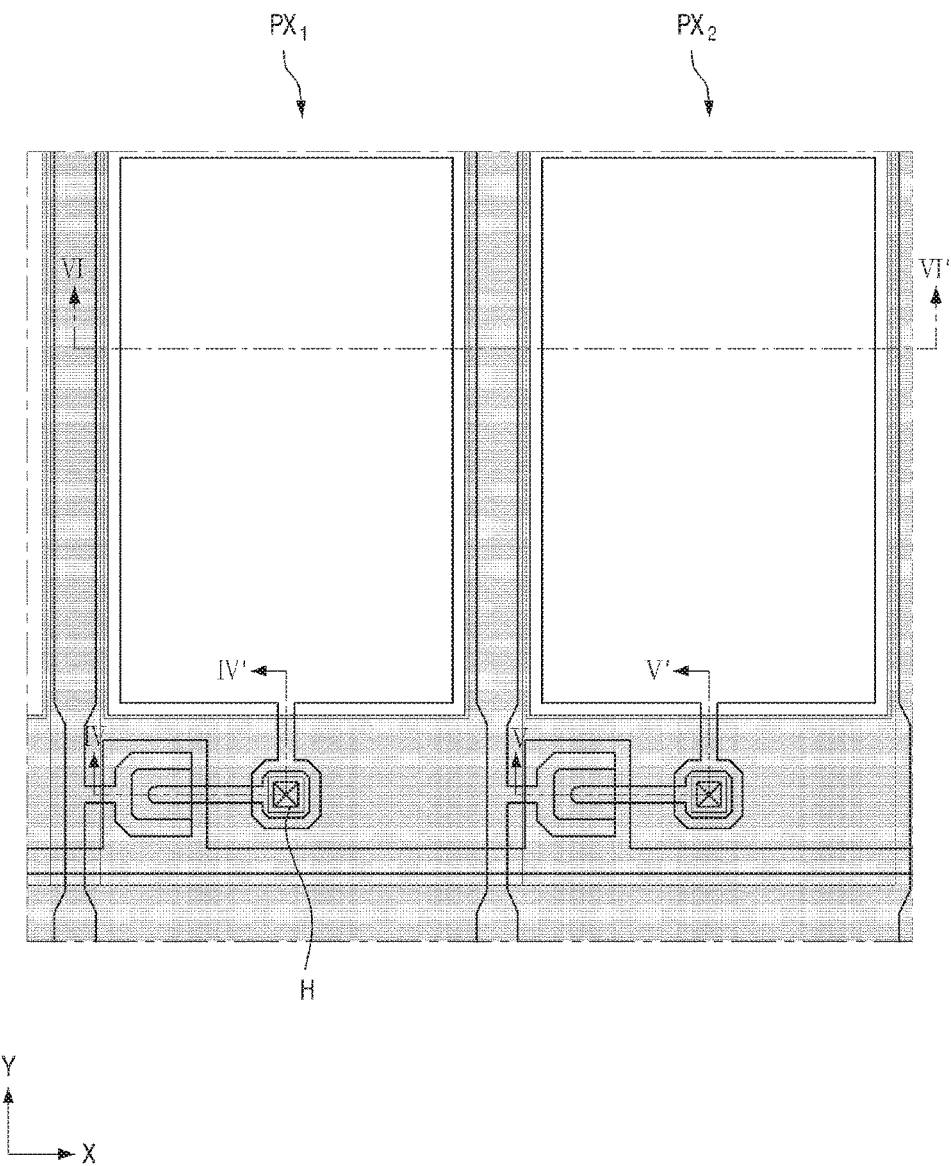
FIG. 1 is a layout of arbitrary pixels of a first display substrate included in a display device according to an embodiment of the present inventive concept.

Features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the inventive concept.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof "At least one" is not to be construed as limiting "a" or "an." "Or" means "and/or." As used herein, the term "and/or" includes any and all combinations of one or more of the associated listed items.

Hereinafter, embodiments of the present inventive concept will be described with reference to the accompanying drawings.

Figure 2:
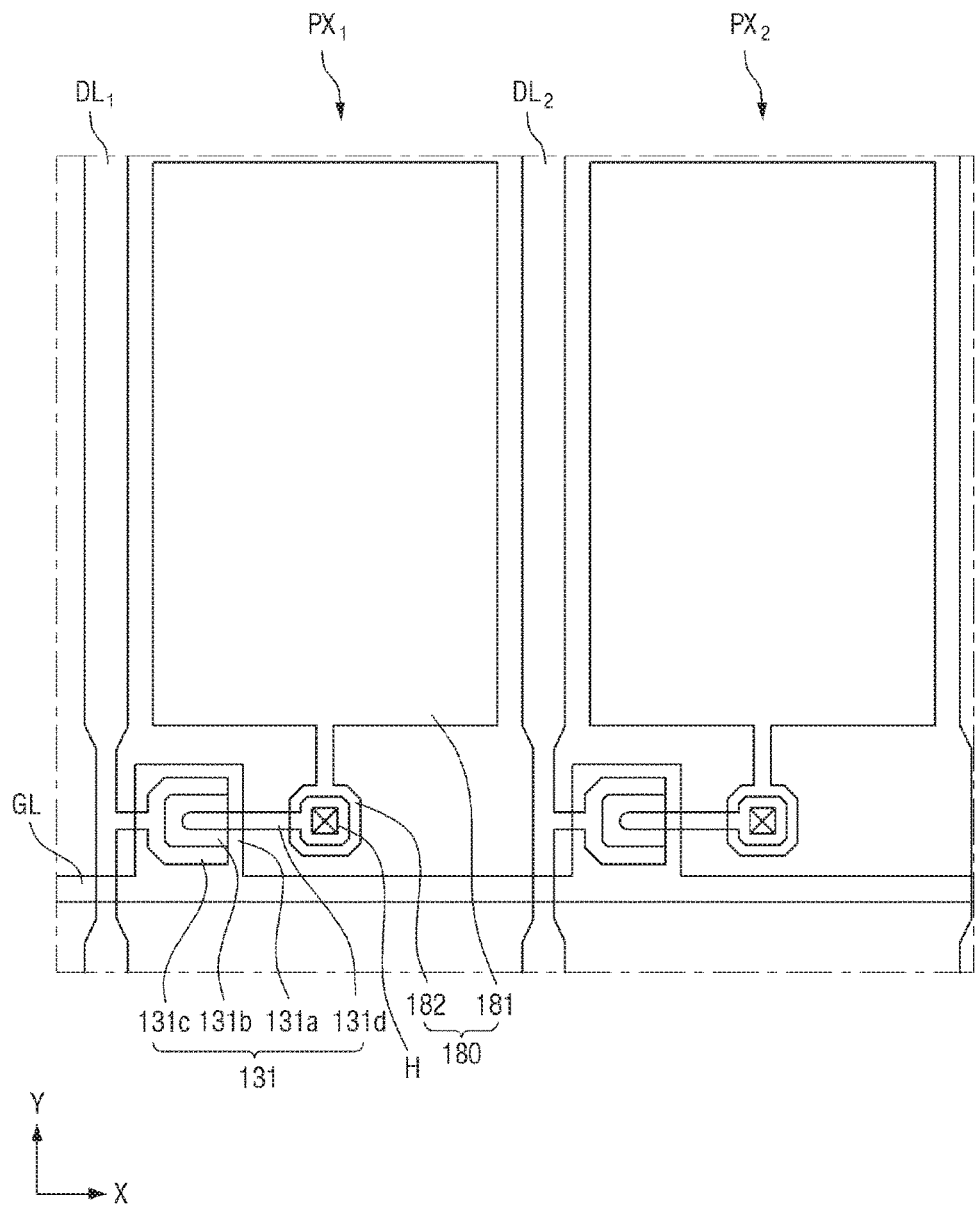
FIG. 2 is a layout illustrating an arrangement of a gate line, a data line, a switching element and a first electrode in the pixel of FIG. 1.
Figure 3:
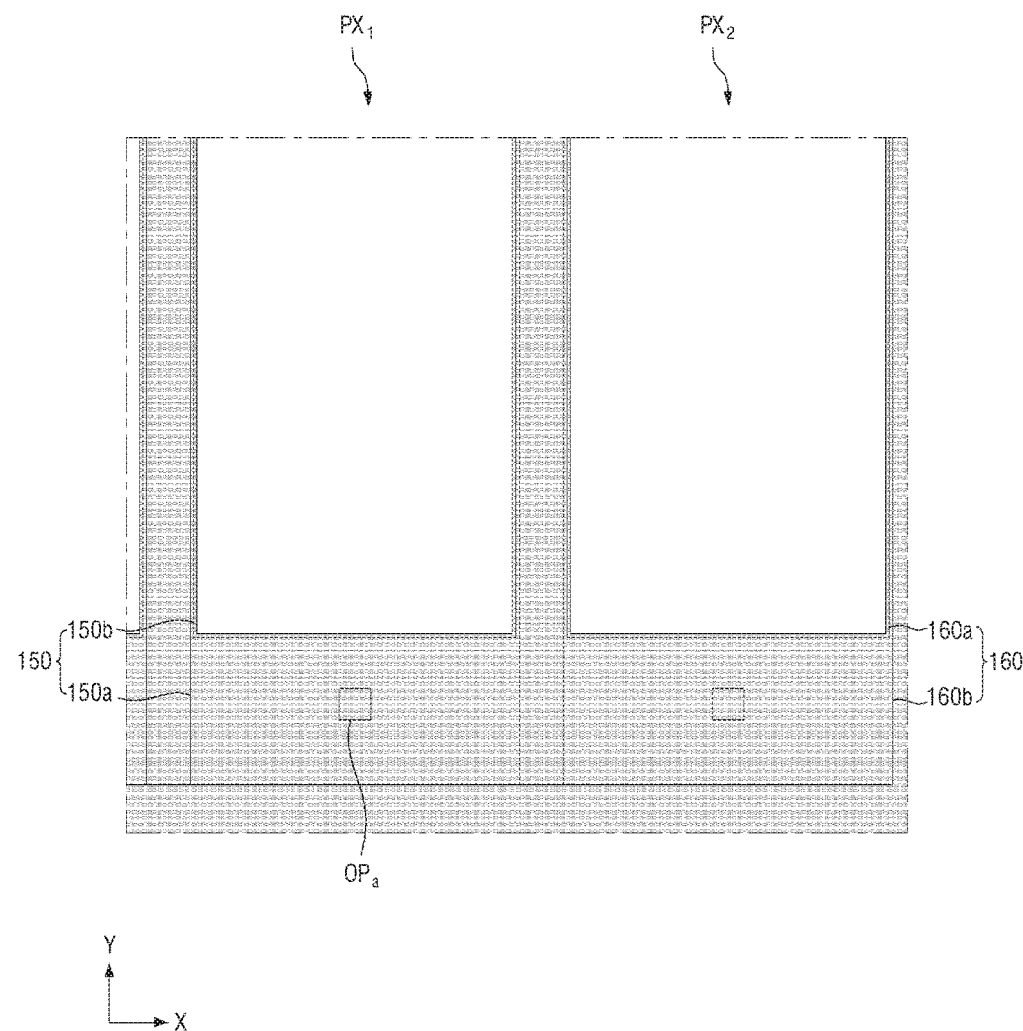
FIG. 3 is a layout illustrating an arrangement of a light shielding member, a wavelength absorption pattern and a wavelength conversion pattern in the pixel of FIG. 1.
Figure 4:
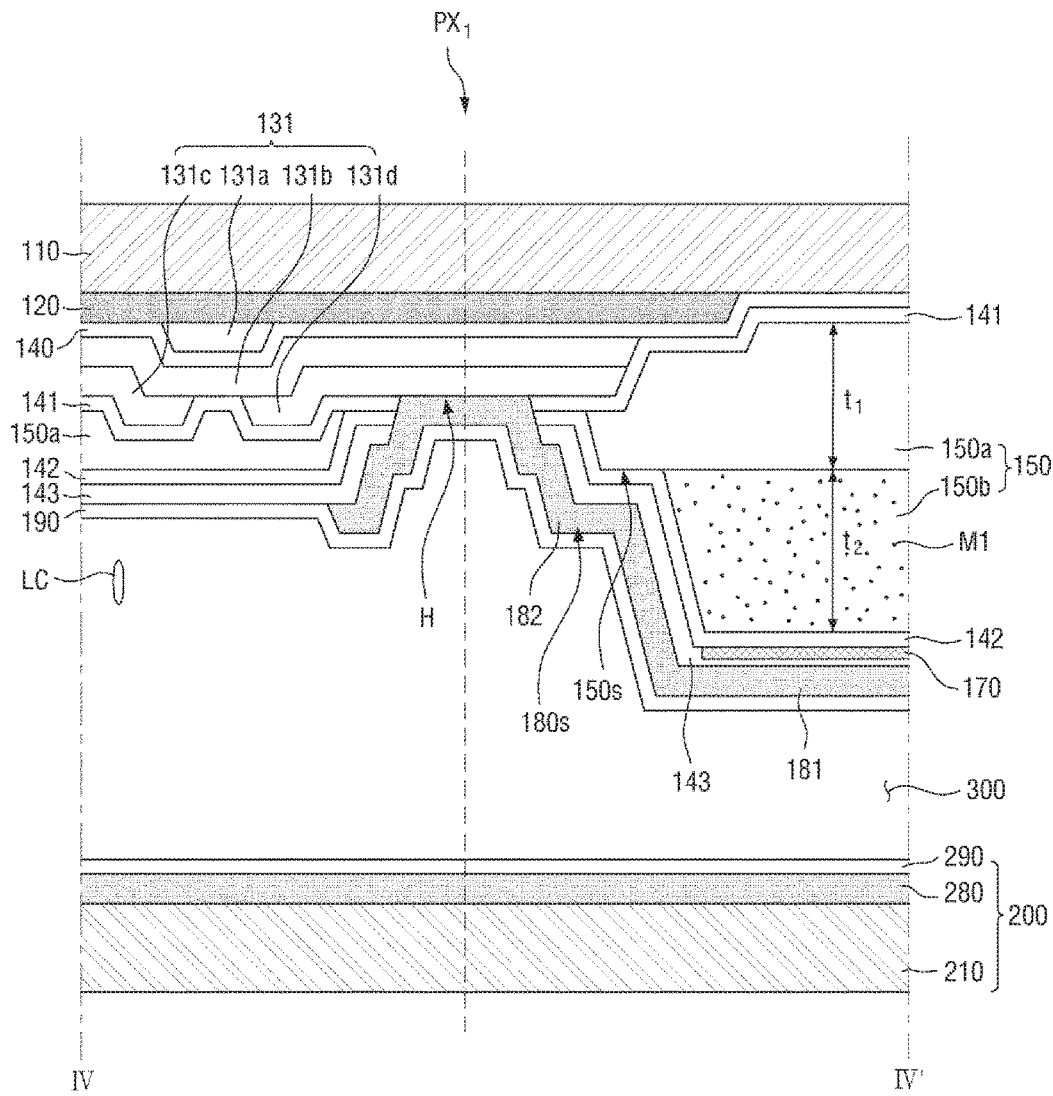
FIG. 4 is a cross-sectional view taken along a line IV-IV' of FIG. 1.
Figure 5:
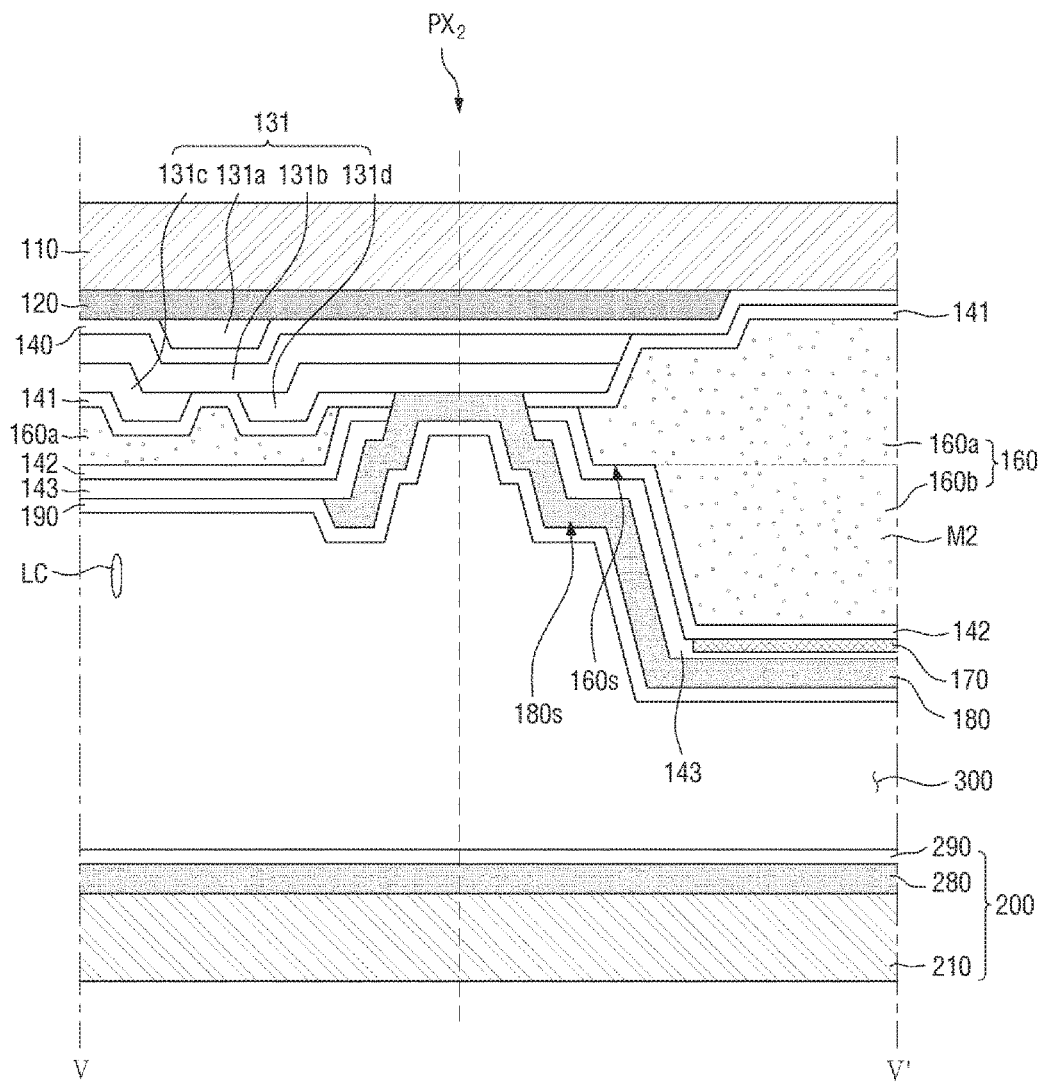
FIG. 5 is a cross-sectional view taken along a line V-V' of FIG. 1.
Figure 6:
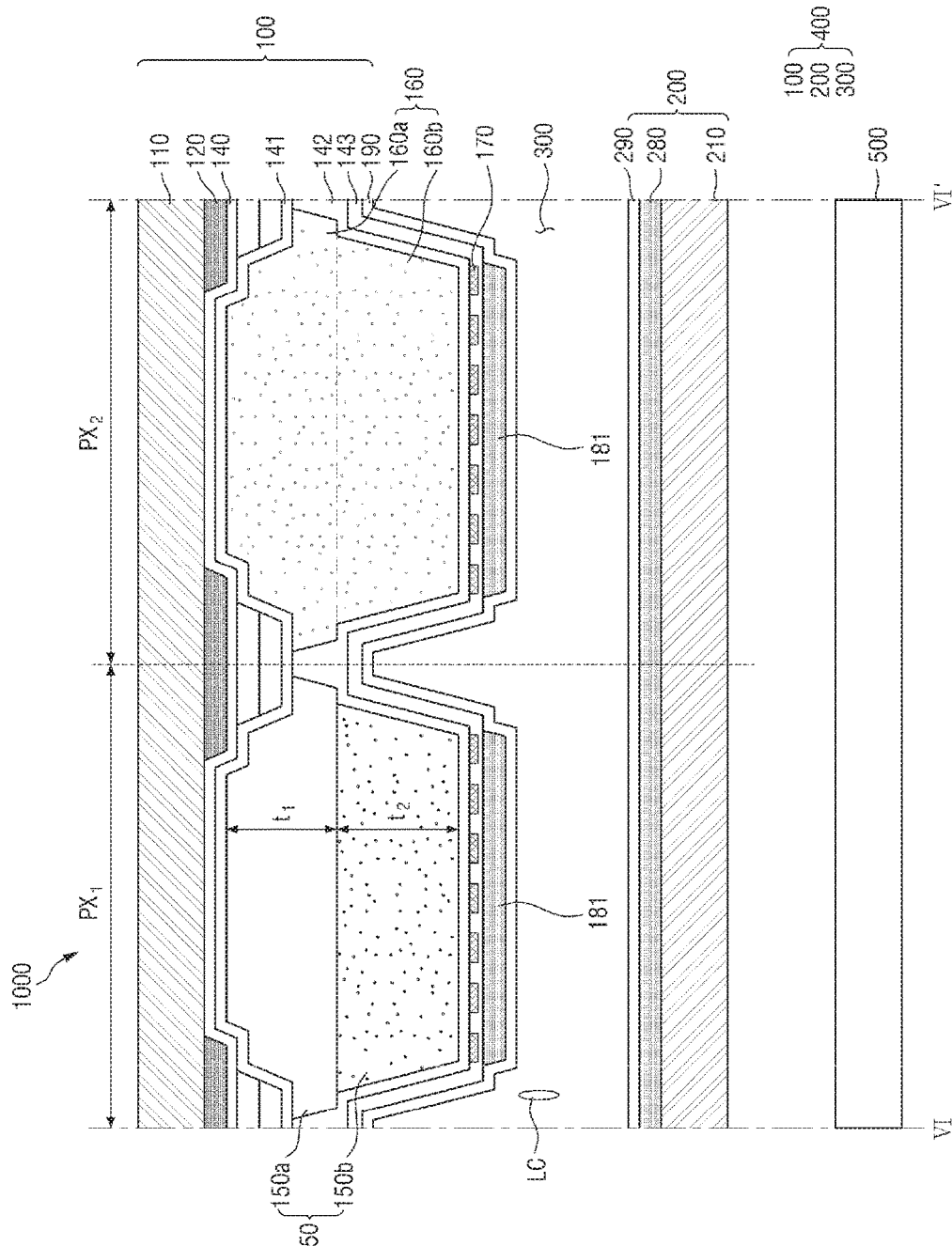
FIG. 6 is a cross-sectional view taken along a line VI-VI' of FIG. 1.

FIG. 1 illustrates a layout of arbitrary pixels of a first display substrate included in a display device according to an embodiment of the present inventive concept. FIG. 2 is a layout illustrating an arrangement of a gate line, a data line, a switching element and a first electrode in the pixel of FIG. 1. FIG. 3 is a layout illustrating an arrangement of a light shielding member, a wavelength absorption pattern and a wavelength conversion pattern in the pixel of FIG. 1. FIG. 4 is a cross-sectional view taken along a line IV-IV' of FIG. 1. FIG. 5 is a cross-sectional view taken along a line V-V' of FIG. 1. FIG. 6 is a cross-sectional view taken along a line VI-VI' of FIG. 1.

Referring to FIGS. 1 to 6, a display device 1000 according to the present embodiment includes a display panel 400 and a light source 500.

A plurality of pixels may be arranged in a matrix configuration in a plan view in the display panel 400. Each of the pixels may display one of the primary colors so as to achieve a color display. For example, the plurality of pixels may include a first pixel $PX_1$ which displays a first primary color, and a second pixel $PX_2$ which displays a second primary color having a center wavelength shorter than that of the first primary color, and may further include a third pixel (not illustrated) which displays a third primary color different from the first primary color and the second primary color. The first pixel $PX_1$, the second pixel $PX_2$ and the third pixel (not illustrated) may be repeatedly disposed in a first direction X and/or a second direction Y to form a basic unit of a display panel. Hereinafter, a case where the first color is red and the second color is blue will be described as an example, but the present inventive concept is not limited thereto.

The display panel 400 may include a first display substrate 100, a second display substrate 200 facing the first display substrate 100, and a liquid crystal layer 300 interposed between the first display substrate 100 and the second display substrate 200. The first display substrate 100 is a substrate on which one or more switching elements 131 for controlling an alignment direction of liquid crystals LC in the liquid crystal layer 300 are arranged, and the second display substrate 200 may be a counter substrate for interposing the liquid crystal layer 300 between the first display substrate 100 and the second display substrate 200.

The first display substrate 100 includes a first insulating substrate 110, a light shielding member 120 disposed on a first side (a bottom surface in the cross-sectional view) of the first insulating substrate 110, a switching element 131 disposed on the light shielding member 120, a color adjustment pattern 150 and a light transmitting pattern 160 disposed on the switching element 131, a first electrode 180 disposed on the color adjustment pattern 150 and the light transmitting pattern 160, and a polarizing element 170 disposed between the color adjustment pattern 150 and the first electrode 180 and between the light transmitting pattern 160 and the first electrode 180.

The first insulating substrate 110 may be a transparent insulating substrate. For example, the first insulating substrate 110 may be a glass or plastic substrate. In some embodiments, the first insulating substrate 110 may be flexible and the display device 1000 may be a curved display device.

The light shielding member 120 may be disposed on the first insulating substrate 110. The light shielding member 120 may absorb or reflect at least light of a specific wavelength band to block transmission of light. For example, the light shielding member 120 may be a black matrix. The light shielding member 120 is arranged at a boundary between adjacent pixels $PX_1$, $PX_2$ and may be arranged in an approximately grid form in a plan view. In an exemplary embodiment, the light shielding member 120 may be disposed to overlap at least a gate line GL, data lines $DL_1$, $DL_2$ and a switching element 131 to be described later to define a light shielding region. By disposing the light shielding member 120 between the first insulating substrate 110 which is disposed close to a viewer and the switching element 131, it is possible to minimize a color mixing failure.

One or more switching elements 131 may be disposed on the light shielding member 120. In an exemplary embodiment, the switching element 131 may be a thin film transistor that includes a gate electrode 131a disposed on the light shielding member 120, an active layer 131b disposed on the gate electrode 131a with an intervening gate insulating film 140, and a source electrode 131c and a drain electrode 131d disposed on the active layer 131b to be spaced apart from each other. The gate electrode 131a serving as a control terminal is connected to the gate line GL to receive a gate driving signal, a source electrode 131c serving as an input terminal is connected to the data line $DL_1$ to receive a data driving signal, and the drain electrode 131d serving as an output terminal may be electrically connected to the first electrode 180 via the contact hole H. The active layer 131b serves as a channel of the thin film transistor, and may turn on or turn off a channel in accordance with the voltage applied to the gate electrode 131a.

The gate electrode 131a and the active layer 131b may be insulated by the gate insulating film 140. A first protective film 141 may be disposed on the active layer 131b, the source electrode 131c and the drain electrode 131d to prevent the lower switching element 131, the gate line GL and the data lines $DL_1$, $DL_2$ from coming into direct contact with an organic material. The gate insulating film 140 and the first protective film 141 may include an inorganic material. Examples of the inorganic material include silicon nitride ($SiN_x$), silicon oxide ($SiO_x$), silicon nitride oxide ($SiN_xO_y$) or silicon oxynitride ($SiO_xN_y$).

The color adjustment pattern 150 may be disposed on the first protective film 141 in the first pixel $PX_1$. The color adjustment pattern 150 may adjust or convert the color of incident light. For example, the color adjustment pattern 150 may absorb at least some of the wavelength bands of the incident light or may convert the center wavelength of the incident light to emit light having a color different from that of the incident light. The color adjustment pattern 150 may be a planarization layer which planarizes uneven surfaces formed thereunder. The color adjustment pattern 150 may have a stepped portion 150s formed on an edge of the color adjustment pattern 150. That is to say, the color adjustment pattern 150 may have a plurality of top surfaces having different levels from each other. For example, the color adjustment pattern 150 may have one or more stepped portions on a cross-section taken along the first direction X and/or the second direction Y.

In an exemplary embodiment, the color adjustment pattern 150 may include a wavelength absorption pattern 150a directly disposed on the first protective film 141, and a wavelength conversion pattern 150b directly disposed on the wavelength absorption pattern 150a. The wavelength absorption pattern 150a may be configured to include a material that absorbs almost all the wavelength bands of the incident light and may selectively transmit only the light having predetermined wavelength bands of the first primary color (i.e., red). For example, the wavelength absorption pattern 150a may be a color filter. The wavelength conversion pattern 150b may include a material that converts or shifts the central wavelength of incident light to the center wavelength of the first primary color (i.e., red). For example, the wavelength conversion pattern 150b may include a light transmitting resin and a wavelength conversion material M1 dispersed in the light transmitting resin. The wavelength conversion material M1 may be a quantum dot, a quantum rod, a phosphate material or the like. The wavelength conversion material M1 may scatter the light incident on the first pixel $PX_1$ in several directions irrespective of the incident angle, thereby improving the side visibility. The wavelength absorption pattern 150a and the wavelength conversion pattern 150b may have inclined sidewalls, respectively. For example, in a plan view, an area of a top surface (a bottom surface in the drawing) of the wavelength absorption pattern 150a may be greater than an area of a bottom surface (a top surface in the drawing) of the wavelength absorption pattern 150a. Further, in a plan view, an area of a top surface (a bottom surface in the drawing) of the wavelength conversion pattern 150b may be smaller than an area of a bottom surface (a top surface in the drawing) of the wavelength conversion pattern 150b.

The light provided from the light source 500 sequentially transmits through the wavelength conversion pattern 150b and the wavelength absorption pattern 150a and may be viewed by the viewer. For example, the wavelength conversion pattern 150b may absorb the center wavelength of the light provided by the light source 500, and may emit light having the center wavelength of the first primary color, thereby primarily enhancing the color purity. Further, the wavelength absorption pattern 150a may absorb almost all the light in the wavelength band, except the center wavelength of the first primary color, of the light emitted from the wavelength conversion pattern 150b, thereby secondarily enhancing color purity. That is, both of the wavelength conversion pattern 150b and the wavelength absorption pattern 150a may be arranged on the optical path of light, thereby further improving the color purity.

The area occupied by the wavelength absorption pattern 150a in a plan view may be larger than the area occupied by the wavelength conversion pattern 150b in a plan view. For example, the area of the top surface (the bottom surface in the drawing) of the wavelength absorption pattern 150a may be larger than the area of the bottom surface (the top surface in the drawing) of the wavelength conversion pattern 150b. In another example, the sidewall of the wavelength absorption pattern 150a may protrude outward from the sidewall of the wavelength conversion pattern 150b to form the stepped portion 150s. That is, the top surface (i.e., the stepped portion) of the wavelength absorption pattern 150a that does not overlap the wavelength conversion pattern 150b may have a predetermined area. In an exemplary embodiment, the wavelength absorption pattern 150a is arranged in most regions except the data lines $DL_1$, $DL_2$ to occupy most areas of the pixel $PX_1$ in a plan view, and may have an opening $OP_a$ formed in the region that overlaps the contact hole H. The wavelength conversion pattern 150b partially overlaps the light shielding member 120, but wavelength conversion pattern 150b is disposed in a light projection region in which light shielding member 120 is not disposed and may not overlap the switching element 131 in a plan view.

A maximum thickness $t_2$ of the wavelength conversion pattern 150b may be greater than a maximum thickness $t_1$ of the wavelength absorption pattern 150a. For example, the maximum thickness $t_2$ of the wavelength conversion pattern 150b is about 5 μm or more and 6 μm or less, the maximum thickness $t_1$ of the wavelength absorption pattern 150a may about 2 μm or more and 3 μm or less, and the maximum thickness of the color adjustment pattern 150 may be about 7 μm or more and 9 μm or less, but the present inventive concept is not limited thereto. The effect of improving the color purity may be maximized by setting the maximum thickness $t_2$ of the wavelength conversion pattern 150b to be larger than the maximum thickness $t_1$ of the wavelength absorption pattern 150a. In addition, an intended effect of improving the color purity is obtained and a sufficient transmittance may be ensured, by setting the thicknesses of the wavelength absorption pattern 150a and the wavelength conversion pattern 150b within the aforementioned range. In this specification, the maximum thickness of the color adjustment pattern 150, the maximum thickness $t_1$ of the wavelength absorption pattern 150a and the maximum thickness $t_2$ of the wavelength conversion pattern 150b may mean the thickness measured in a light projection region that does not overlap the light shielding member 120.

A light transmitting pattern 160 may be arranged on the first protective film 141 in the second pixel $PX_2$. The light transmitting pattern 160 may transmit the incident light as it is, without substantially converting the color of the incident light, for example, the center wavelength of the incident light. The light transmitting pattern 160 may be a planarization layer which planarizes uneven surfaces formed thereunder. The light transmitting pattern 160 may have a stepped portion 160s formed on an edge of the light transmitting pattern 160. In other words, the light transmitting pattern 160 may have a plurality of top surfaces having different levels from each other. For example, the light transmitting pattern 160 may have one or more stepped portions on the cross-section of the light transmitting pattern 160 taken along the first direction X and/or the second direction Y.

In an exemplary embodiment, the light transmitting pattern 160 may include a first portion 160a directly disposed on the first protective layer 141, and a second portion 160b directly disposed on the first portion 160a. The first portion 160a and the second portion 160b may be integrally formed without a physical boundary. For example, the light transmitting pattern 160 may be formed through a photolithography technique using a slit mask or a multi-tone mask. In another embodiment, a physical boundary may be formed between the first portion 160a and the second portion 160b. For example, the light transmitting pattern 160 may be formed by a method of applying the light transmitting resin composition onto the first portion 160a again to pattern the second portion 160b, after forming the light transmitting resin composition to pattern the first portion 160a.

The light transmitting pattern 160 may include a light transmitting resin, and light scattering particles $M_2$ dispersed in the light transmitting resin. The light scattering particles $M_2$ may scatter the light incident on the second pixel $PX_2$ in a plurality of directions irrespective of the incident angle, without converting the wavelength of the light incident on the second pixel $PX_2$, thereby improving the side visibility. The light scattering particles $M_2$ may be material having a different refractive index from the light transmitting resin that is included in the light transmitting pattern 160. For example, the light scattering particles $M_2$ may be organic or inorganic particles, organic or inorganic composite particles, or particles having a hollow structure. Examples of the organic particles may include acrylic resin particles or urethane resin particles, and examples of the inorganic particles may include metal oxide particles such as titanium oxide.

The first portion 160a of the light transmitting pattern 160 has substantially the same shape as the wavelength absorption pattern 150a of the color adjustment pattern 150, and the second portion 160b may have substantially the same shape as the wavelength conversion pattern 150b. For example, the first portion 160a and the second portion 160b may have inclined sidewalls, respectively. The area of the top surface (the bottom surface in the drawing) of the first portion 160a in a plan view may be greater than the area of the bottom surface (the top surface in the drawing) of the first portion 160a in a plan view. Further, the area of the bottom surface (the top surface in the drawing) of the second portion 160b in a plan view may be greater than the area of the top surface (the bottom surface in the drawing) of the second portion 160b in a plan view. In another example, in a plan view, the area occupied by the first portion 160a may be larger than the area occupied by the second portion 160b. In still another example, the sidewall of the first portion 160a may project outward from the sidewall of the second portion 160b to form a stepped portion 160s. That is, the top surface (i.e., the stepped portion) of the first portion 160a that does not overlap the second portion 160b may have a predetermined area. The maximum thickness of the light transmitting pattern 160 may be substantially the same as the maximum thickness of the color adjustment pattern 150. FIG. 5 and the like illustrate a case where the maximum thickness of the first portion 160a is smaller than the maximum thickness of the second portion 160b, but the maximum thickness of the first portion 160a and the maximum thickness of the second portion 60b may be the same, or the maximum thickness of the first portion 160a may be larger. In this specification, the maximum thickness of the light transmitting pattern 160, the maximum thickness of the first portion 160a and the maximum thickness of the second portion 160 may mean the thickness measured in the light projection region that does not overlap the light shielding member 120.

The color adjustment pattern 150 and the light transmitting pattern 160 may be arranged to simultaneously overlap the light shielding member 120 which is arranged at the boundary between the first pixel $PX_1$ and the second pixel $PX_2$. For example, in a cross-section in which the first pixel $PX_1$ and the second pixel $PX_2$ are cut along the first direction X, a certain light shielding member 120 may simultaneously overlap the color adjustment pattern 150 and the light transmitting pattern 160. In an exemplary embodiment, both of the wavelength absorption pattern 150a and the wavelength conversion pattern 150b may overlap the light shielding member 120. As a result, it is possible to minimize color mixing failure that occurs at the boundary between adjacent pixels $PX_1$ and $PX_2$.

Further, the color adjustment pattern 150 and the light transmitting pattern 160 may be disposed on the light shielding member 120 so as to be spaced apart from each other. For example, the wavelength absorption pattern 150a which forms the most-protruding outer circumference in the color adjustment pattern 150 and the first portion 160a which forms the most-protruding outer circumference in the light transmitting pattern 160 may be disposed on the light shielding member 120 so as to be spaced apart from each other in the second direction Y. By physically separating the color adjustment pattern 150 and the light transmitting pattern 160 having relatively similar refractive indexes, it is possible to prevent the problem in which the light incident on the color adjustment pattern 150 proceeds toward the light transmitting pattern 160 to cause the color mixing failure or the light incident on the light transmitting pattern 160 process toward the color adjustment pattern 150 to cause the color mixing failure. Further, by disposing the color adjustment pattern 150 and the light transmitting pattern 160 on the first display substrate 100 arranged to be closer to the viewer side than the second display substrate 200, side visibility may be improved, and the color mixing failure may be minimized. Further, by disposing the color adjustment pattern 150 and the light transmitting pattern 160 on the same substrate as the first electrode 180 to be described later, there is an effect of further improving the color mixing failure due to the misalignment. Furthermore, it is possible to improve the process characteristics, by disposing the color adjustment pattern 150 and the light transmitting pattern 160 which are vulnerable to high temperature on the switching element 131 which is formed through a high temperature process.

In another embodiment, between the color adjustment pattern 150 and the first protective film 141, and between the light transmitting pattern 160 and the first protective film 141, a planarization layer (not illustrated) formed of an organic material may be further disposed.

The second protective film 142 may be disposed on the color adjustment pattern 150 and the light transmitting pattern 160. The second protective film 142 may include an inorganic material or an organic material. The second protective film 142 may have a predetermined planarizing function. The second protective film 142 may suppress contamination of the liquid crystal layer 300 caused by particles introduced from the color adjustment pattern 150 or a compound such as a pigment.

The polarizing element 170 may be disposed on the second protective film 142. The polarizing element 170 may be an optical filter that transmits light waves of a specific polarization and blocks light waves of other polarization. The polarizing element 170, another polarizing element (not illustrated) disposed opposite to the polarizing element 170 with the liquid crystal layer interposed therebetween, and the liquid crystal layer 300 perform an optical shutter function, thereby making it possible to control the amount of light transmitted through each of the pixels $PX_1$, $PX_2$. In an exemplary embodiment, the polarizing element 170 may be a reflective polarizing element, but the inventive concept is not limited thereto. The reflective polarizing element may transmit polarized light parallel to the transmission axis direction and may reflect polarized light parallel to the reflection axis direction. Although FIG. 6 and the like illustrate a wire grid polarizing element as the polarizing element 170, a film type reflective polarizing element in which two layers having different refractive indexes in the in-plane uniaxial direction are alternately and repeatedly laminated may also be used. The wire grid polarizing element includes a plurality of line grid patterns which extends in one direction (e.g., the second direction Y) and is repeatedly arranged in the first direction X to be spaced apart from each other. The transmission axis of the polarizing element 170 may be approximately parallel to the first direction X, and the reflection axis may be approximately parallel to the second direction Y. The line grid pattern may include aluminium, silver, copper, nickel or the like. A capping film 143 may be disposed on the polarizing element 170 to suppress failure such as corrosion of the polarizing element 170 and to flatten the step formed by the polarizing element 170.

A first electrode 180 may be disposed on the capping film 143. The first electrode 180 may be a pixel electrode that is disposed for each of the pixels $PX_1$, $PX_2$ and is controlled by a data driving signal. The first electrode 180 may be a transparent electrode. Examples of the material forming the transparent electrode include indium tin oxide, indium zinc oxide and the like. The first electrode 180 and a second electrode 280 to be described later may control the alignment direction of the liquid crystals LC, by applying an electric field to the liquid crystal layer 300. The first electrode may include a body electrode 181, and a protruding electrode 182 protruding from the body electrode 181.

The body electrode 181 has an approximately square shape in a plan view, is arranged in the light projection region and may occupy almost all the entire region of each of the pixels $PX_1$, $PX_2$ in a plan view. The body electrode 181 may be used as a main electrode section which controls the alignment of the liquid crystals LC in the liquid crystal layer 300 within the light projection region. Although FIG. 1 and the like illustrate a case where the body electrode 181 is an electrode having no slit, the body electrode 181 may have a fine slit in another embodiment. The protruding electrode 182 may protrude from the body electrode 181 to the contact hole H, for example, in the second direction Y (e.g., the lower side of the layout) and may be electrically connected to the switching element 131. A distal end of the protruding electrode 182 may have a wide portion (a pad portion) so as to stably come into contact with the switching element 131. The protruding electrode 182 protruding in the second direction Y may have one or more stepped portions. In the exemplary embodiment, the protruding electrode 182 overlapping the color adjustment pattern 150 (or the light transmitting pattern 160) may have a stepped portion 180s that is formed by the stepped portion 150s of the color adjustment pattern 150 (or the stepped portion 160s of the light transmitting pattern). Although the color adjustment pattern 150 having a sufficient thickness, for example, a thickness of 7 μm or more, is disposed between the switching element 131 and the first electrode 180 to form a relatively large height difference between the switching element 131 and the topmost surface of the first electrode 180, since the protrusion electrode 182 being in contact with the switching element 131 has the stepped portion 180s, it is possible to prevent an open circuit of the protruding electrode 182 which may be caused by a step form in the contact hole H.

A first alignment film 190 may be further disposed on the first electrode 180. The first alignment film 190 may include a polymer material having an imide group within a repeating unit of main chain. The first alignment film 190 may control the initial alignment state of the adjacent liquid crystal LC.

Next, the second display substrate 200 will be described. The second display substrate 200 may include a second insulating substrate 210, and a second electrode 280 disposed on one surface (a top surface in a cross-sectional view) of the second insulating substrate 210.

The second insulating substrate 210 may be a transparent insulating substrate similar to the first insulating substrate 110. The second electrode 280 may be a common electrode which is not patterned corresponding to the pixels and to which a common voltage is applied. The second electrode 280 may be a transparent electrode similar to the first electrode 180. A second alignment film 290 may be further disposed on the second electrode 280. The second alignment film 290 may include a polymer material having an imide group within a repeating unit of a main chain. The second alignment film 290 may control the initial alignment state of the adjacent liquid crystal LC.

Next, the liquid crystal layer 300 will be described. The liquid crystal layer 300 includes a plurality of liquid crystals LC. The liquid crystals LC have a negative dielectric anisotropy and may be vertically aligned in the initial alignment state. In another embodiment, the liquid crystals LC may have a positive dielectric anisotropy and may be horizontally aligned in the initial alignment state. In this specification, the initial alignment state means an alignment state of the liquid crystals LC in a state in which no electric field is applied to the liquid crystal layer 300.

The light source 500 may be disposed on the lower side of the display panel 400 to emit light of a specific wavelength to the display panel 400 side. As the light source 500, an LED light source, an OLED light source, a fluorescent lamp light source or the like may be applied. In an exemplary embodiment, the light source 500 may emit light having a single center wavelength that is shorter than the center wavelength of red (i.e., the first primary color) and the center wavelength of the green. For example, the light source 500 may be a light source that provides blue light with a center wavelength in the range of about 400 nm to 500 nm. In another embodiment, the light source 500 may provide light of a wavelength of ultraviolet light, and in this case, instead of the light scattering particles, a wavelength conversion material which converts the center wavelength of the incident light into the central wavelength of blue may be disposed in the pixels which display blue.

Hereinafter, a display device according to another embodiment of the present inventive concept will be described.

Figure 7A:
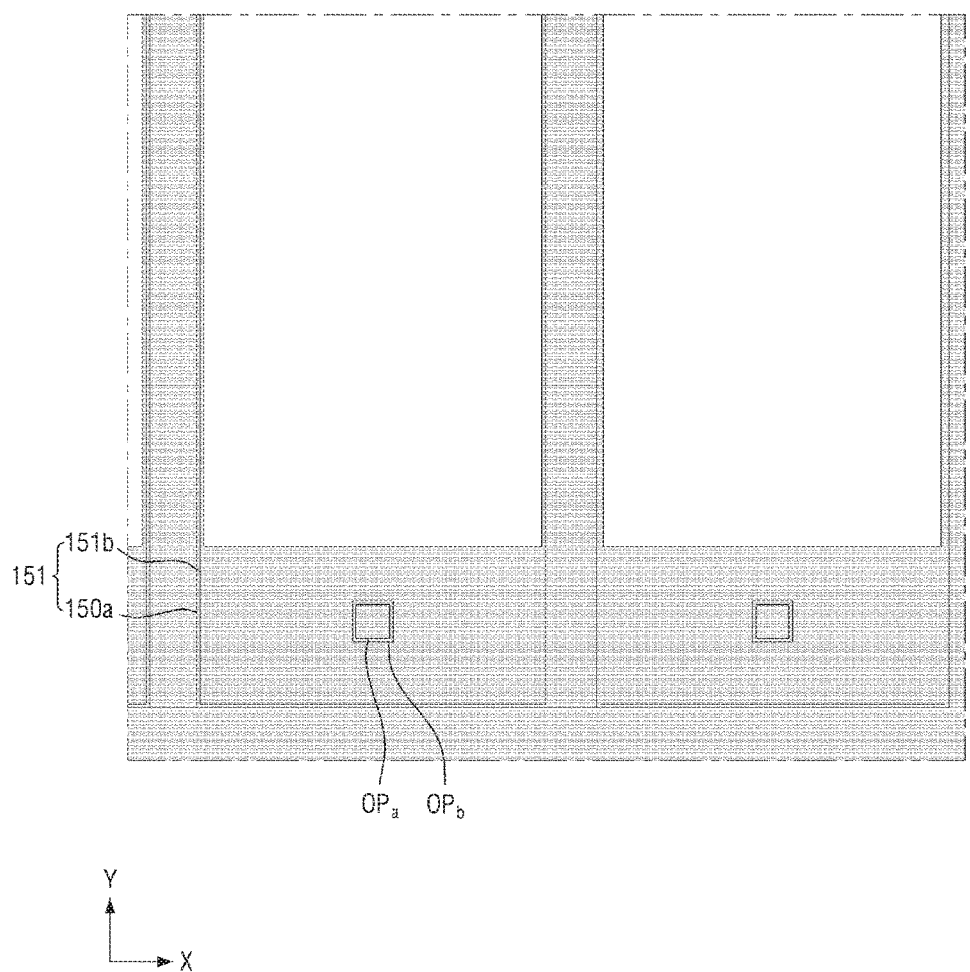
FIGS. 7A and 7B are diagrams illustrating a display device according to another embodiment of the present inventive concept.
Figure 7B:
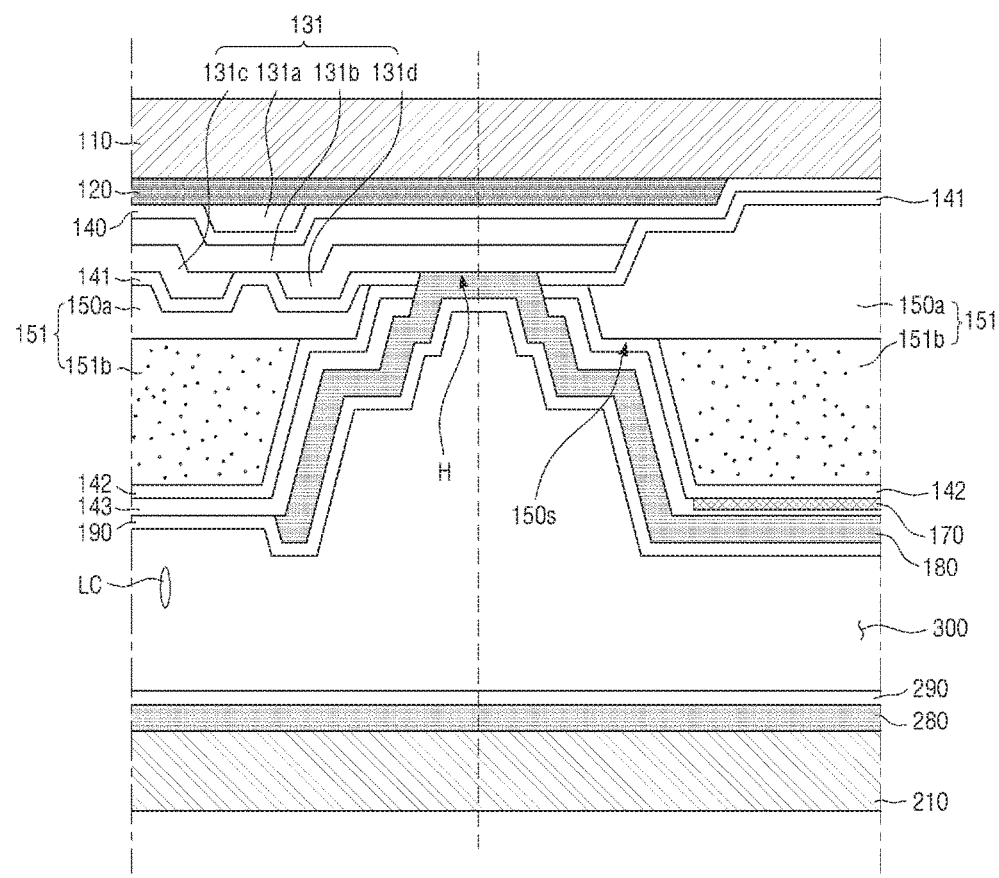

FIGS. 7A and 7B are diagrams illustrating a display device according to another embodiment of the present inventive concept. Specifically, FIG. 7A illustrates a layout of a display device according to another embodiment of the present inventive concept corresponding to FIG. 3, and FIG. 7B illustrates a cross-sectional view of a first pixel corresponding to FIG. 4 of the display device of FIG. 7A.

Referring to FIGS. 7A and 7B, the display device according to the present embodiment is different from the display device 1000 according to the embodiment of FIG. 1 and the like in that a wavelength conversion pattern 151b overlaps the switching element in a plan view.

In an exemplary embodiment, the wavelength conversion pattern 151b is disposed in most regions except some regions overlapping the data lines $DL_1$, $DL_2$ to occupy most area of the first pixel $PX_1$ in a plan view, and may have an opening $OP_b$ formed in the region that overlaps the contact hole H. That is, in a plan view, the area occupied by the wavelength conversion pattern 151b is smaller than the area occupied by the wavelength conversion pattern 150a, but the wavelength conversion pattern 151b may be disposed to overlap at least partially the light shielding region defined by the light shielding member 120.

In a plan view, the opening $OP_b$ of the wavelength conversion pattern 151b may be larger than the opening $OP_a$ of the wavelength absorption pattern 150a. That is to say, since the wavelength absorption pattern 150a with an opening portion $OP_a$ having a relatively small size formed therein and the wavelength conversion pattern 151b with an opening portion $OP_b$ having a relatively large size formed therein are sequentially disposed on the top of the first protective film 141 having the contact hole H formed therein, the stepped portion 150s may be formed on all the walls of the contact hole H. This makes it possible to more stably prevent an open circuit of the protruding electrode.

Figure 8A:
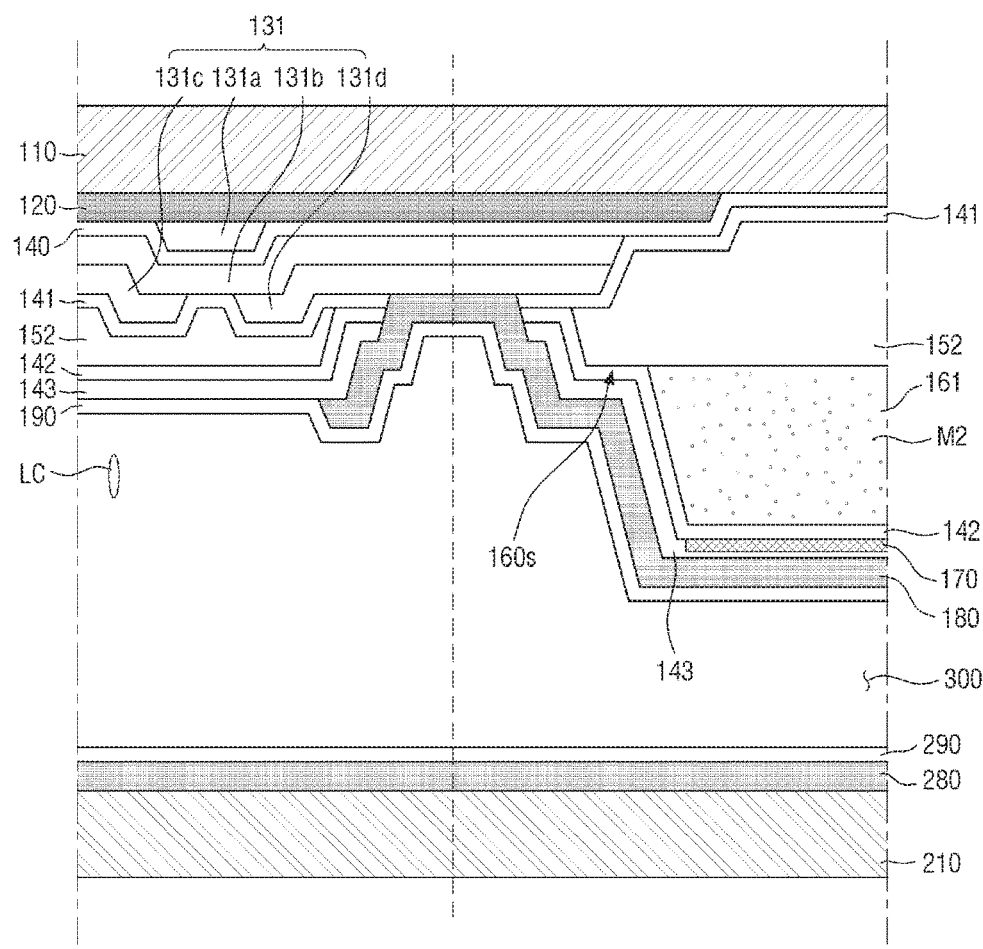
FIGS. 8A and FIG. 8B are diagrams illustrating a display device according to another embodiment of the present inventive concept.
Figure 8B:
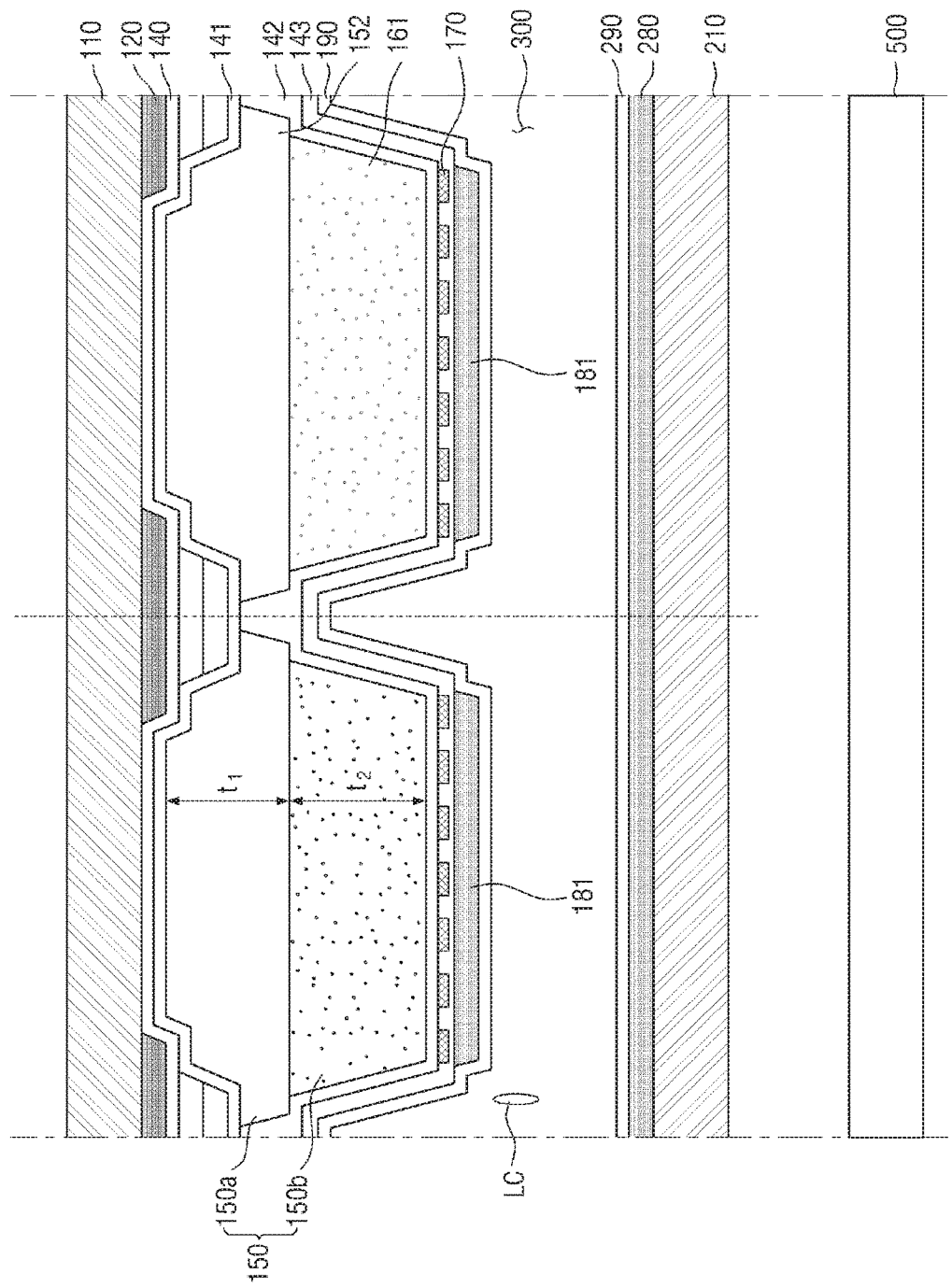

FIGS. 8A and 8B are diagrams illustrating a display device according to still another embodiment of the present inventive concept. Specifically, FIG. 8A is a cross-sectional view of a second pixel of a display device according to still another embodiment of the present inventive concept corresponding to FIG. 5, and FIG. 8B is a cross-sectional view of the display device of FIG. 8A corresponding to FIG. 6.

Referring to FIGS. 8A and 8B, the display device according to the present embodiment is different from the display device 1000 according to the embodiment of FIG. 1 and the like in that the former further includes a second wavelength absorption pattern 152 disposed between the first insulating substrate 110 and the light transmitting pattern 161 in a second pixel.

In an exemplary embodiment, the second wavelength absorption pattern 152 may be disposed directly on the first protective film 141, and the light transmitting pattern 161 may be disposed directly on the second wavelength absorption pattern 152. The second wavelength absorption pattern 152 may include a material which absorbs most of all the wavelength bands of the incident light and may selectively transmit only light of a predetermined wavelength bands of the second primary color (i.e., blue). For example, the second wavelength absorption pattern 152 may be a blue color filter.

The second wavelength absorption pattern 152 has substantially the same shape as the wavelength absorption pattern 150a of the color adjustment pattern 150, and the light transmitting pattern 161 may have substantially the same shape as the wavelength conversion pattern 150b. For example, in a plan view, the area occupied by the second wavelength absorption pattern 152 may be larger than the area occupied by the light transmitting pattern 161. In another example, the sidewall of the second wavelength absorption pattern 152 may protrude to the outside from the sidewall of the light transmitting pattern 161 to form the stepped portion 160s. Further, the maximum thickness of the second wavelength absorption pattern 152 may be smaller than the maximum thickness of the light transmitting pattern 161.

Figure 9A:
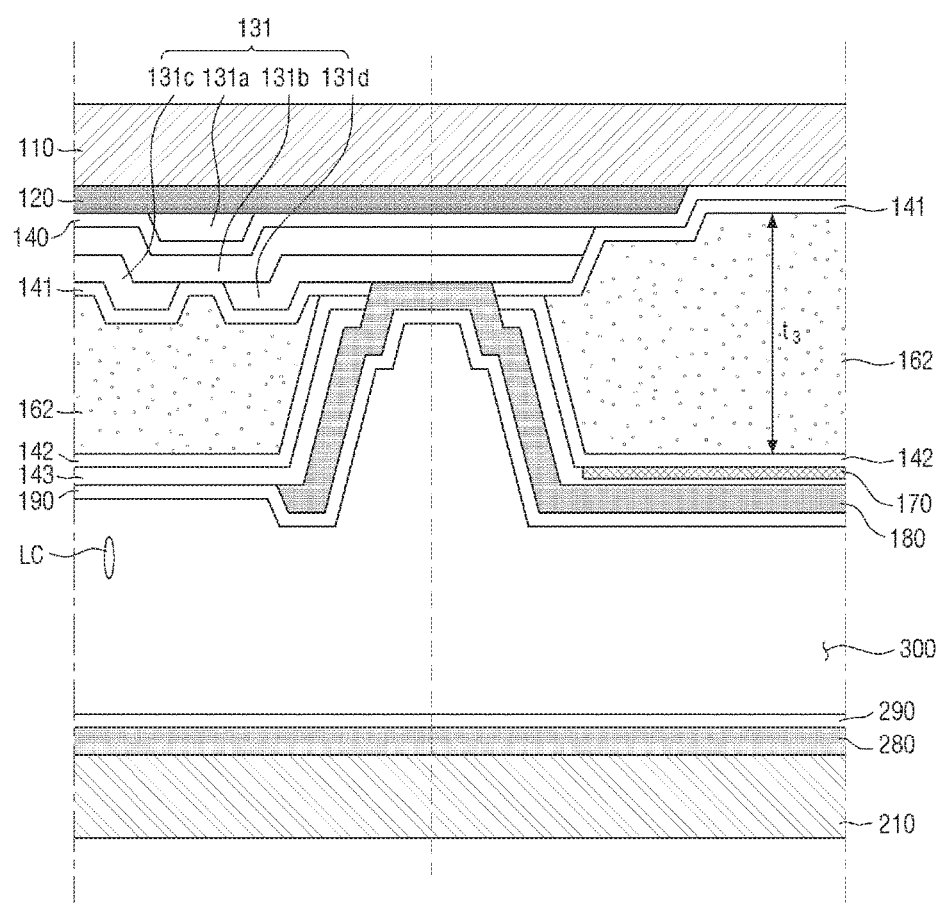
FIGS. 9A and 9B are diagrams illustrating a display device according to still another embodiment of the present inventive concept.
Figure 9B:
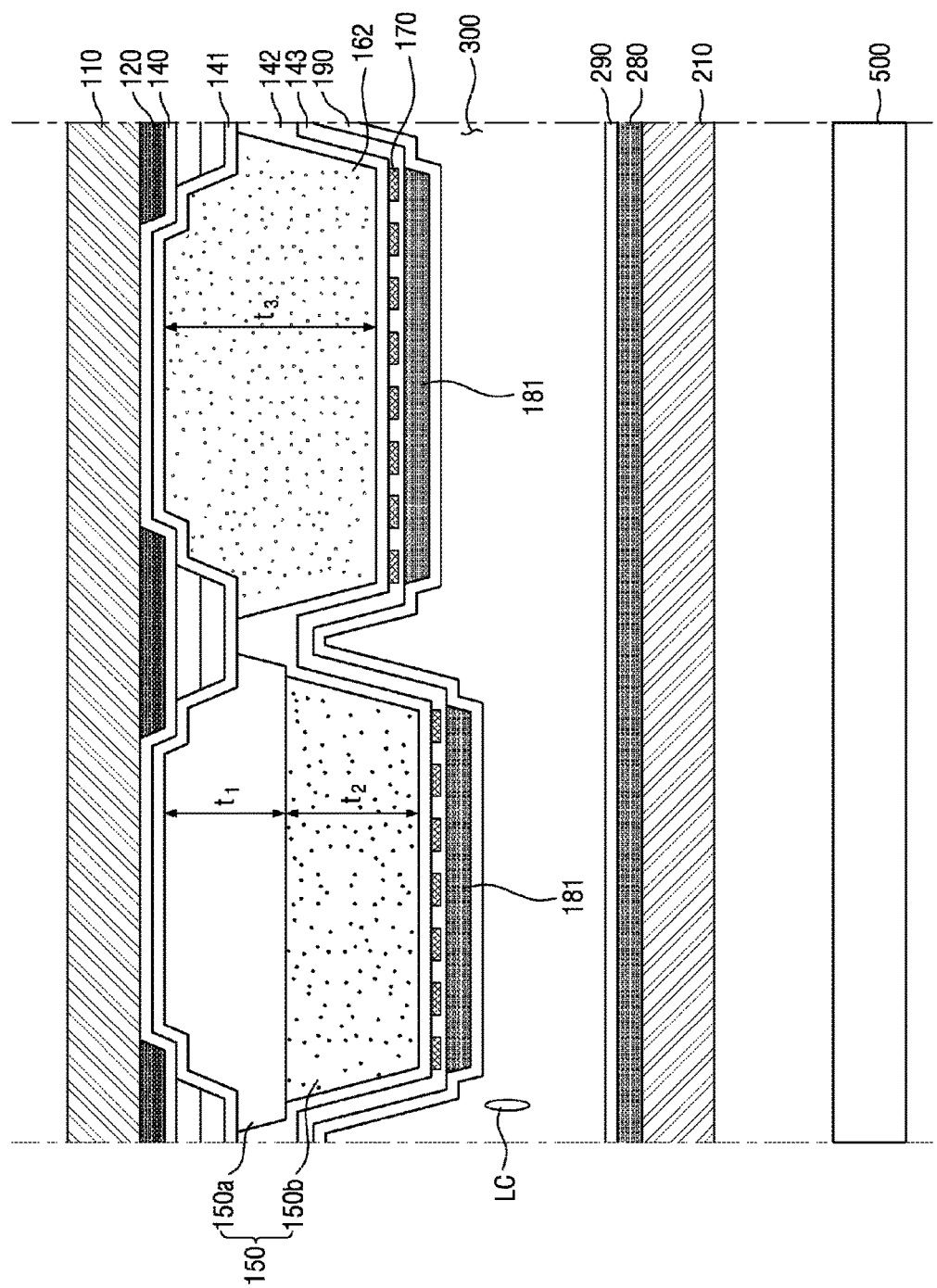

FIGS. 9A and 9B are drawings illustrating a display device according to still another embodiment of the present inventive concept. Specifically, FIG. 9A is a cross-sectional view of a second pixel of a display device according to still another embodiment of the present inventive concept corresponding to FIG. 5, and FIG. 9B is a cross-sectional view of the display device of FIG. 9A corresponding to FIG. 6.

Referring to FIGS. 9A and 9B, the display device according to the present embodiment is different from the display device 1000 according to the embodiment of FIG. 1 and the like in that a maximum thickness $t_3$ of the light transmitting pattern 162 in the second pixel is smaller than a maximum thickness $t_1+t_2$ of the color adjustment pattern 150 in the first pixel.

The light transmitting pattern 162, which emits the scattered light without substantially converting the center wavelength of the light incident on the light transmitting pattern 162, may have a relatively thinner thickness than the thickness of the color adjustment pattern 150. In an exemplary embodiment, the maximum thickness $t_3$ of the light transmitting pattern 162 may be greater than the maximum thickness $t_1$ of the wavelength absorption pattern 150a and the maximum thickness $t_2$ of the wavelength conversion pattern 150b. For example, the maximum thickness $t_3$ of the light transmitting pattern 162 may be about 6 μm or more and 8 μm or less, but the present inventive concept is not limited thereto. By setting the maximum thickness $t_3$ of the light transmitting pattern 162 within the aforementioned range, a difference between the thickness of the liquid crystal layer 300 in the first pixel and the thickness of the liquid crystal layer 300 in the second pixel may be reduced. In some embodiments, the light transmitting pattern 162 may not have a stepped portion. That is, the sidewall of the light transmitting pattern 162 may have a substantially constant inclination.

Further, since the color adjustment pattern 150 and the light transmitting pattern 162 have different thicknesses, the height of the elements stacked on the top of the patterns may become different from each other. For example, the polarizing element 170 overlapping the color adjustment pattern 150 and the polarizing element 170 overlapping the light transmitting pattern 162 may be located at levels different from each other.

While the present inventive concept has been particularly illustrated and described with reference to exemplary embodiments thereof, it will be understood by those of ordinary skill in the art that various changes in form and detail may be made therein without departing from the spirit and scope of the present inventive concept as defined by the following claims. The exemplary embodiments should be considered in a descriptive sense only and not for purposes of limitation.

What is claimed is:
1. A display device in which a plurality of pixels comprising a first pixel for displaying a first primary color is defined, the display device comprising:
   an insulating substrate; and
   a color adjustment pattern which is disposed in the first pixel on the insulating substrate and alters the color of the incident light,
   wherein the color adjustment pattern comprises:
      a wavelength absorption pattern which is disposed on the insulating substrate and selectively transmits a predetermined wavelength band of the incident light, and
      a wavelength conversion pattern which is disposed directly on the wavelength absorption pattern and converts a center wavelength of the incident light from a light source to the predetermined wavelength band, and
   wherein the wavelength conversion pattern exposes a top surface of the wavelength absorption pattern disposed on an edge of the wavelength absorption pattern to form a first stepped portion in a plan view.
2. The display device of claim 1,
   wherein, in a plan view, an area occupied by the wavelength absorption pattern is larger than an area occupied by the wavelength conversion pattern.

3. The display device of claim 2, wherein, in a plan view, the area of a top surface of the wavelength absorption pattern is greater than that of a bottom surface of the wavelength conversion pattern.

4. The display device of claim 2, further comprising:
a switching element which is disposed between the insulating substrate and the color adjustment pattern; and
a pixel electrode which is disposed on the color adjustment pattern and is electrically connected to the switching element.

5. The display device of claim 4, further comprising:
a polarizing element disposed between the color adjustment pattern and the pixel electrode.

6. The display device of claim 5, further comprising
a liquid crystal layer disposed on the pixel electrode,
wherein the light source emits light having a center wavelength shorter than that of the first primary color.

7. The display device of claim 6, further comprising:
a light shielding member disposed between the insulating substrate and the switching element.

8. The display device of claim 4, wherein the pixel electrode has a second stepped portion formed by the first stepped portion.

9. The display device of claim 8, wherein at least a part of the wavelength conversion pattern overlaps the switching element.

10. The display device of claim 1, wherein the plurality of pixels further comprises a second pixel which displays a second primary color having a center wavelength shorter than that of the first primary color, and
the display device further comprises a light transmitting pattern which is disposed in the second pixel on the insulating substrate and includes a light transmitting resin and light scattering particles dispersed in the light transmitting resin.

11. The display device of claim 10, wherein the color adjustment pattern comprises:
a wavelength absorption pattern that transmits a predetermined wavelength band of incident light; and
a wavelength conversion pattern which converts a center wavelength of the incident light.

12. The display device of claim 11, wherein a thickness of the light transmitting pattern is greater than a thickness of the wavelength absorption pattern, and
the thickness of the light transmitting pattern is greater than a thickness of the wavelength conversion pattern.

13. The display device of claim 11, wherein the light transmitting pattern has a third stepped portion formed on a sidewall.

14. The display device of claim 11, further comprising:
a second wavelength absorption pattern which is disposed between the insulating substrate and the light transmitting pattern and is disposed in the second pixel to selectively transmit a predetermined wavelength band of the incident light.

15. The display device of claim 11, further comprising a light shielding member which is disposed on the insulating substrate to overlap the wavelength absorption pattern and the light transmitting pattern,
wherein the wavelength absorption pattern and the light transmitting pattern are spaced apart from each other on the light shielding member.

16. A display device in which a plurality of pixels including a first pixel and a second pixel is defined, the display device comprising:
an insulating substrate;
a color adjustment pattern which is disposed in the first pixel on the insulating substrate, wherein the color adjustment pattern comprises:
a wavelength absorption pattern which is disposed on the insulating substrate and selectively transmits a predetermined wavelength band of the incident light, and
a wavelength conversion pattern which is disposed directly on the wavelength absorption pattern and converts a center wavelength of the incident light from a light source to the predetermined wavelength band, and
wherein the wavelength conversion pattern exposes a top surface of the wavelength absorption pattern disposed on an edge of the wavelength absorption pattern in a plan view; and
a light transmitting pattern which is disposed in the second pixel on the insulating substrate,
wherein the first pixel displays a first primary color,
the second pixel displays a second color having a center wavelength shorter than the first color, and
a thickness of the color adjustment pattern is greater than a thickness of the light transmitting pattern.

17. The display device of claim 16, further comprising:
a protective film which is disposed on the color adjustment pattern and the light transmitting pattern; and
a polarizing element which is disposed on the protective film and overlaps the color adjustment pattern and the light transmitting pattern,
wherein the polarizing element overlapping the color adjustment pattern and the polarizing element overlapping the light transmitting pattern are located at different levels.

18. The display device of claim 17, wherein the thickness of the color adjustment pattern is 7 µm or more and 9µm or less.

19. The display device of claim 18,
wherein a thickness of the wavelength conversion pattern is larger than a thickness of the wavelength absorption pattern.

20. The display device of claim 19, wherein an area of a top surface of the wavelength absorption pattern is greater than an area of a bottom surface of the wavelength conversion pattern.

* * * * *